Feb. 3, 1931. J. C. LJUNGMAN 1,791,452
APPARATUS FOR DELIVERING LIQUIDS IN MEASURED QUANTITIES
Filed Dec. 10, 1928

Patented Feb. 3, 1931

1,791,452

UNITED STATES PATENT OFFICE

JACOB CARL LJUNGMAN, OF MALMO, SWEDEN

APPARATUS FOR DELIVERING LIQUIDS IN MEASURED QUANTITIES

Application filed December 10, 1928, Serial No. 325,007, and in Sweden December 15, 1927.

This invention relates to an apparatus for delivering liquids in measured quantities, and is especially directed to a measuring vessel for inflammable liquids. This measuring vessel is especially adapted to be used at the ordinary gasoline depots provided with a so-called selling pump or other measuring apparatus for the retailing of liquid fuel, which pump or the like usually has an adjustable volume not smaller than five litres. These five litres are then let into the measuring vessel by which the liquid may be thereafter easily retailed by the litre from an adjustable measuring can. Thus it will be easy enough at the benzine depots to serve, in addition to motorists, such customers, for instance motor cyclists, who frequently wish to buy a quantity less than five litres or a number of litres not evenly divisible by five.

The characteristic feature of the invention consists in the device by means of which it will be possible to obtain from a depository in the vessel an automatic filling of the measuring can, and thereafter to empty its contents simply by tilting the vessel, whereby the measuring in this manner will be so exact that the measuring apparatus might be accepted for legal testing.

In the accompanying drawing the invention is shown in a preferred form of execution.

Figures 1, 2:
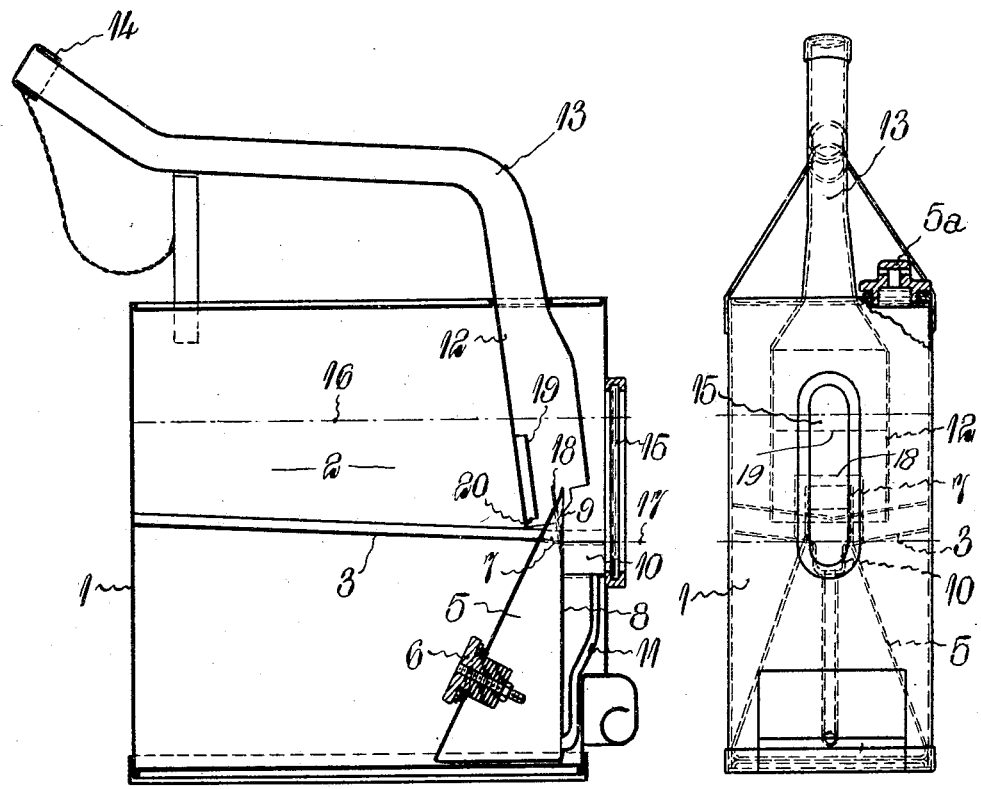
Figure 1 shows a vertical section through the measuring vessel.
Figure 2 shows an end view of the vessel.
Figure 3:
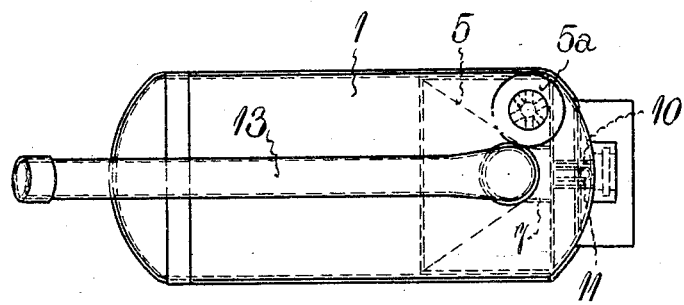
Figure 3 is a plan view of the same.

The vessel 1 may be of any convenient shape and its upper portion forms a depository or receptacle 2 having a sloping bottom 3 and an opening for refilling closed by a threaded stopper or plug 5a.

At the bottom near one of its end walls the vessel contains a pyramidal measuring can 5 having an adjustable stopper 6, the channel shaped top 7 of said can projecting through the bottom 3 at the lowest part of the latter, the joint being watertight. The side wall 8 of the measuring can facing the adjacent wall of the measuring vessel is vertical when the vessel is resting on a horizontal support. In this side 8 the measuring can is provided with an outlet opening 9 extending above the bottom 3 and into the channel top 7 which extends above the bottom 3. Directly underneath the bottom 3 and between the wall 8 of the measuring can and the adjacent wall of the vessel, a small pocket 10 is provided which is open at the top towards the receptacle 2, and which also may be considered as a depression in said receptacle. From the bottom of this pocket or depression 10, the volume of which is equal to the volume of the top portion or channel 7 of the measuring can 5 extending above the bottom 3, an air inlet pipe 11 extends into the can 5 to a place near the bottom of the same.

The channel shaped top 7 of the measuring can 5 communicates through its outlet opening 9 directly with an intake opening in a rectangular reception funnel 12 contained in the receptacle 2, which funnel extends upwardly above the vessel in the shape of a conveniently bent tube 13 carrying a closing cap 14. The funnel 12 is open at its lower end towards the receptacle or the interior of the chamber 2.

The level of the liquid in the chamber 2 and the pocket 10 can be verified by means of a gauge or the like 15 fitted on the vessel, when the vessel is resting on a horizontal plane. This gauge has two marks, the higher one indicating the highest level 16 to which the chamber 2 may be filled, and the lower one indicating the lowest level 17 to which the liquid must reach in order to obtain the prescribed measure at the dispensing.

When the measuring can, for instance, is supposed to hold one litre and the receptacle 2 to be filled, five litres at a time, the receptacle 2 ought to have a volume of, for instance, eight litres and to have such a shape that the level of the liquid will be at the mark 16 after introducing for instance six litres, of which one litre accumulates in the measuring can 5, and that the quantity of liquid contained in the receptacle, when the vessel is tilted so that the tube 13 is directed downwards and the wall 8 approaches horizontal position, may be accommodated well under the funnel 12 and may pass away from said funnel before the latter has been tilted to such a position that any part of the liquid can escape through the same directly from the receptacle 2. For this purpose the funnel 12 is also slightly inclined, about 10°, with regard to a vertical plane when the vessel is resting upon a horizontal support, from the wall of the vessel adjacent to the measuring can, which latter has a lengthened rectangular or oval horizontal cross section.

When the dispensing vessel is tilted in the direction stated above in such a way that the wall 8 of the measuring can is in a horizontal position, the level of the liquid in the can 5 will be on a level with the edge of the outlet opening 9, as at the tilting a subsequent filling of the measuring can takes place from the pocket or depression 10 in such a way that the measuring can, when the wall 8 is horizontal, is invariably filled to the very edge of the comparatively narrow opening 9, if the liquid before the tilting of the vessel has reached the level 17.

When the vessel is further tilted in the same direction as before, the quantity of liquid exactly measured by the measuring can, as described above, flows through the outlet 9 down into the funnel 12 and out through the tube 13, and air passes through the pipe 11 into the measuring vessel so that the latter may be rapidly emptied, without bubbling in the outlet.

Thus, while the measuring can invariably delivers each time to the funnel 12 a quantity of liquid properly measured with great exactitude, it is on the other hand very important for the reliability of the measuring apparatus that the quantity of liquid thus delivered to the funnel in its entirety passes away through the tube 13 and does not in part try to get into the receptacle or chamber 2. In order to prevent this a drip guard 18 is provided on the outlet channel 7 and a partition or sheet guard 19 is carried on the inside of the funnel 12, said partition receiving the liquid flowing from the outlet 9. Liquid directed towards the edge 20 of this partition turns around this free edge and passes underneath the partition towards the tube 13, so that no part of the liquid gets an opportunity to escape from the funnel to the receptacle 2.

Of course, it is necessary that the vessel, after each delivery of one litre or of the quantity of liquid for which the measuring can is dimensioned, be placed or held upright a moment so that the measuring can will be filled again before the next delivery, and each time the liquid must reach the level 17. If this is not the case the receptacle 2 must be filled again so that it contains five litres.

In practice the apparatus, of course may be varied in different ways within wide limits according to requirement, and the invention is not limited to the form shown and described.

What I claim and desire to secure by Letters Patent is:—

1. A tiltable measuring vessel for delivering liquids in measured quantities comprising a main, tiltable receptacle; an auxiliary receptacle underneath said main receptacle, an outlet tube, terminating in a funnel, mounted in the main receptacle, and having its lower end opening towards the interior of said main receptacle and having its other end communicating with the exterior beyond the main receptacle; an outlet member on said auxiliary receptacle and projecting through the bottom of the main receptacle and opening into the open end of the funnel, the said auxiliary receptacle being filled from the main receptacle through the said outlet member, as an incident to the main receptacle assuming an upright position; the said funnel having an inclined position with respect to the interior of the main receptacle, whereby when the said measuring vessel is tilted, the liquid in the main receptacle recedes from the funnel before any liquid can escape through the latter and the said outlet tube.

2. A tiltable measuring vessel, comprising a main receptacle having an elongated horizontal cross section; an auxiliary receptacle forming a measuring can arranged under the main receptacle at one end thereof, and communicating with the same; a funnel provided in the main receptacle adjacent that end thereof communicating with the auxiliary receptacle; an outlet tube extending from said funnel and leading to the exterior of the main receptacle; and means in said auxiliary receptacle projecting through the bottom of the main receptacle and opening thereinto adjacent the open end of the funnel.

3. A measuring vessel, comprising a main receptacle having an elongated horizontal cross section; an auxiliary receptacle forming a measuring can, said auxiliary receptacle having a substantially pyramidal shape and being arranged underneath the main receptacle at one end thereof and being in communication with the same; a funnel provided in the main receptacle; an outlet tube extending from said funnel and leading to the exterior of the main receptacle; and a channel-shaped top on said measuring can projecting through the bottom of the main receptacle, said channel-shaped top being provided with an inlet and discharge opening which communicates with said main receptacle adjacent the open inner end of said funnel.

4. A measuring vessel, comprising a main receptacle having an elongated horizontal cross section; an auxiliary receptacle forming a measuring can and arranged beneath said main receptacle at one end thereof, and communicating therewith; a funnel provided in the main receptacle towards that end of the receptacle adjacent the auxiliary receptacle, an outlet tube communicating with said funnel and leading therefrom to the exterior of the main receptacle, means forming a pocket arranged adjacent the top of the measuring can near its point of communication with the main receptacle and, under the bottom of the main receptacle, whereby the pocket and the top of the measuring can are in liquid communication when the latter is in its dispensing position, the said pocket communicating with the interior of the main receptacle, the said pocket thus forming a depression in the latter, and means whereby the said pocket is connected with the auxiliary receptacle adjacent the bottom thereof.

5. A measuring vessel comprising a main receptacle having an elongated horizontal cross section and substantially vertical and horizontal walls; an auxiliary receptacle forming a measuring can arranged under the main receptacle, at one end thereof and communicating therewith and having one wall adjacent one of the normally vertical walls of the main receptacle; a funnel provided in the main receptacle adjacent that end thereof which is adjacent the auxiliary receptacle, an outlet tube communicating with said funnel and extending outwardly of said receptacle; means forming a pocket adjacent the top of the measuring can near its point of communication with the main receptacle, and under the bottom of the main receptacle, whereby the pocket and the top of the measuring can are in liquid communication when the latter is in its dispensing position, the said pocket communicating with the interior of the main receptacle; said pocket being positioned between a vertical wall of the measuring can and the adjacent wall of the vessel; and a gauge carried on the said last mentioned wall, whereby the level of the liquid in the receptacle and the pocket can be observed.

6. A measuring vessel comprising a main receptacle having an elongated horizontal cross section; an auxiliary receptacle of substantially pyramidal shape forming a measuring can, and being arranged under the main receptacle at one end of the latter and communicating with the same; a funnel provided in the main receptacle; an outlet tube communicating with said funnel and extending outwardly from the said main receptacle; a top for the said auxiliary receptacle having a channel therein, the said top projecting upwardly through the bottom of the main receptacle and opening thereinto adjacent the open end of the funnel; a drip guard arranged at the outlet of the measuring can; and a partition wall having a free lower edge, and coacting with the said funnel and with the said drip-guard in such manner as to prevent liquid from escaping from the funnel and the measuring can to the interior of the main receptacle during the emptying operation.

7. A measuring vessel as in claim 3 and further characterized in that the bottom of the said main receptacle slopes downwardly towards the region where the top of the measuring can extends therethrough.

In testimony whereof I have signed my name to this specification.

JACOB CARL LJUNGMAN.